May 31, 1949.  V. E. MARK ET AL  2,471,634
REFRIGERATOR CLOSURE AND SEAL
Filed July 27, 1944  2 Sheets-Sheet 1

Inventors
Lloyd L. Anderson
Vennice E. Mark
By Liverance and
Van Antwerp
Attorneys May 31, 1949.  V. E. MARK ET AL  2,471,634
REFRIGERATOR CLOSURE AND SEAL
Filed July 27, 1944  2 Sheets-Sheet 2
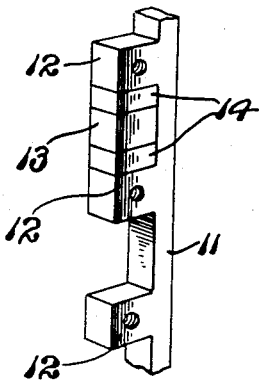
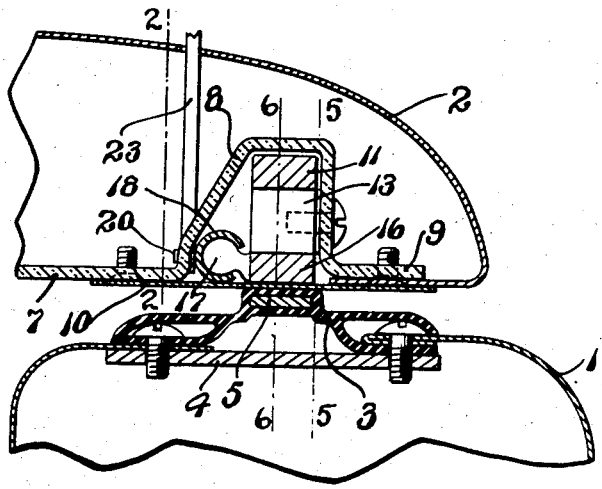
Inventors
Lloyd L. Anderson
Vennice E. Mark
By Liverance and
Van Antwerp
Attorneys Patented May 31, 1949

2,471,634

UNITED STATES PATENT OFFICE 2,471,634

REFRIGERATOR CLOSURE AND SEAL

Vennice E. Mark and Lloyd L. Anderson, Grand Rapids, Mich., assignors to Winters & Crampton Corporation, Grandville, Mich., a corporation of Michigan Application July 27, 1944, Serial No. 546,888

3 Claims. (Cl. 20—69)

This invention relates to a novel construction of closure and seal which is of particular value in connection with refrigerators, but may also be used in many other places where an effective seal upon a door being closed is desired. In refrigeration the seal is for the purpose of sealing against the entrance of heat into the refrigerator at or around the door opening to achieve economy in refrigeration and to reduce operation of the refrigeration machinery to a minimum.

In the present invention, as is also the case with respect to inventions disclosed in copending applications filed by us of even date, a sealing gasket of a flexible nature is interposed between the door and the casing of a refrigerator or other similar structure to surround the opening in the casing, and normally is held under a relatively heavy compression force exerted by the door through a releasable latch on the door engaging with a keeper on the door casing. The gasket may be attached to either the door or the outer face of the refrigerator around the opening, and heretofore, with the mechanical manually operable latches generally used, care was necessary to provide as accurate bearing surfaces for the gasket to engage against as possible in order to obtain a substantial uniform pressure of the gasket upon the surfaces against which it engaged. This necessitated having surfaces without pronounced irregularities, concavities and convexities therein which were to be eliminated as far as practicable, resulting in an additional cost of manufacture. In the present invention a magnetic holding of the door in closed position is provided with members carried by the flexible gasket which, mounted on either the door or refrigerator casing, it attracted to magnets mounted upon the casing or the door. Such magnetic attraction becomes effective when the door is moved to its closed position. And by reason of the readily flexible nature of the gasket an effective seal is made with a conformation of the gasket to the surfaces against which it engages, thereby avoiding the care in producing gasket contacting surfaces and the consequent expense previously undergone in connection with the use of mechanical spring actuated or cam operated latches. Such substantially perfect sealing contact of the gasket with the surface against which it engages is also attained without the necessity of any unduly strong force required to hold the door closed to bring the gasket into effective sealing engagement with the surface against which it bears.

In the present invention a novel, relatively inexpensive and effective magnetic holding of a door closure in closed position and with an effective seal has been attained together with a simple readily operable means of rendering the magnetic holding of the door closed ineffective, whereby the door may be released at any time desired for opening to gain access to the interior of the refrigerator or other structure on which the door is mounted.

An understanding of the invention may be had from the following description taken in connection with the accompanying drawings, in which, Fig. 1 is a front elevation showing a refrigerator having my invention applied thereto with the door open.

Fig. 4 is a fragmentary horizontal section enlarged taken through the free edge of the door and adjacent portion of the refrigerator casing with the door closed.

Figure 1:
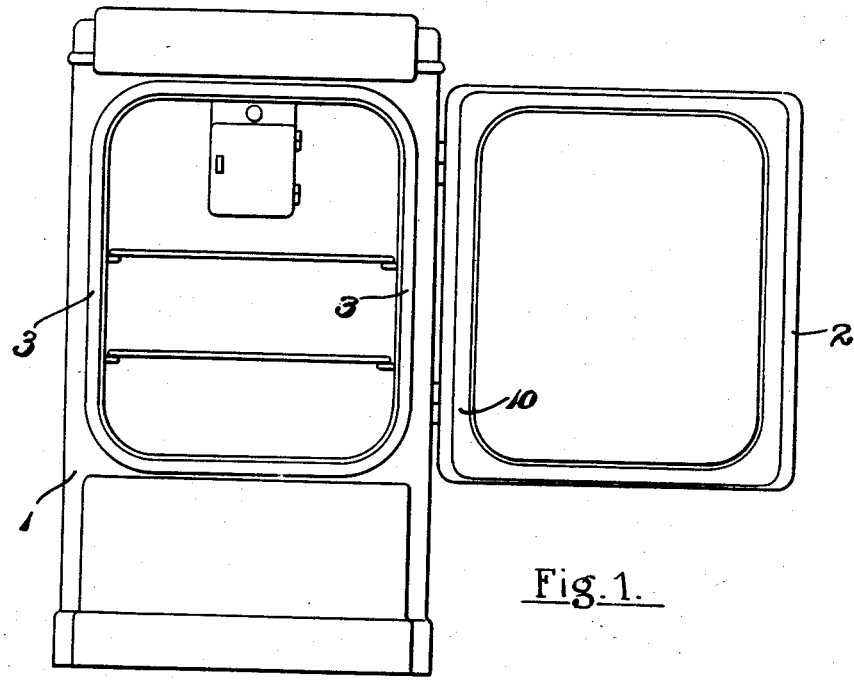

Figs. 5 and 6 are fragmentary vertical sections substantially on the planes of lines 5—5 and 6—6 of Fig. 4 looking to the left, and Fig. 7 is a section similar to Fig. 6 and upon the plane of the same line, 6—6, of Fig. 4 but with the parts released to move the door for opening.

Like reference characters refer to like parts in the different figures of the drawings.

The refrigerator casing 1 may be of a usual construction with an opening at its front for access to the interior and with a door 2 hingedly mounted thereon to close said opening. In the instant disclosure the sealing gasket 3 is mounted at the outer face of the refrigerator around the front opening therein. The gasket (Fig. 4) is made of a flexible elastic material such as rubber or the like and preferably is of the form shown in cross section in Fig. 4 with side edge portions adapted to be connected by screws or equivalent connections threaded through a reinforcing plate 4 at the inner side of the shell of the refrigerator entirely around the front opening thereof. The intermediate portion of the gasket is spaced away from said plate providing a flexible arch, and molded in and carried by the gasket are a plurality of short, preferably flat members 5 of soft iron which may be spaced short distances from each other (Figs. 5, 6 and 7) so as to not interfere with the flexible nature of the gasket which, as is evident, is readily yieldable inwardly upon application of pressure thereto and which will conform at its outer side to the surface of the object which it is pressed against.

At the inner side of the door 2 a plate 7 of non-magnetic material is located which, near the peripheral edges of the door, is formed into a substantially channel form as at 8, its outer end portion terminating in a flange 9, with which and the plate 7 a thin plate 10 also of non-magnetic material is connected extending across the open side of the channel. This provides a continuous channel chamber around the door within which the magnetic structure of my invention is housed.

Within the channel and seated substantially at the bottom thereof is a holder support in the form of a bar 11 from which at equally spaced intervals spacing fingers 12 extend toward the plate 10. Between adjacent fingers a magnet 13 is located at each side of which is a block 14 of non-magnetic material, the outer faces of the magnets and the blocks 14 being flush with the outer ends of the fingers 12 (Fig. 8). The bar 11 and fingers 12 are connected with one side of the channel support 8 by screws or other equivalent fastenings as shown in Fig. 4.

Figures 2, 3:
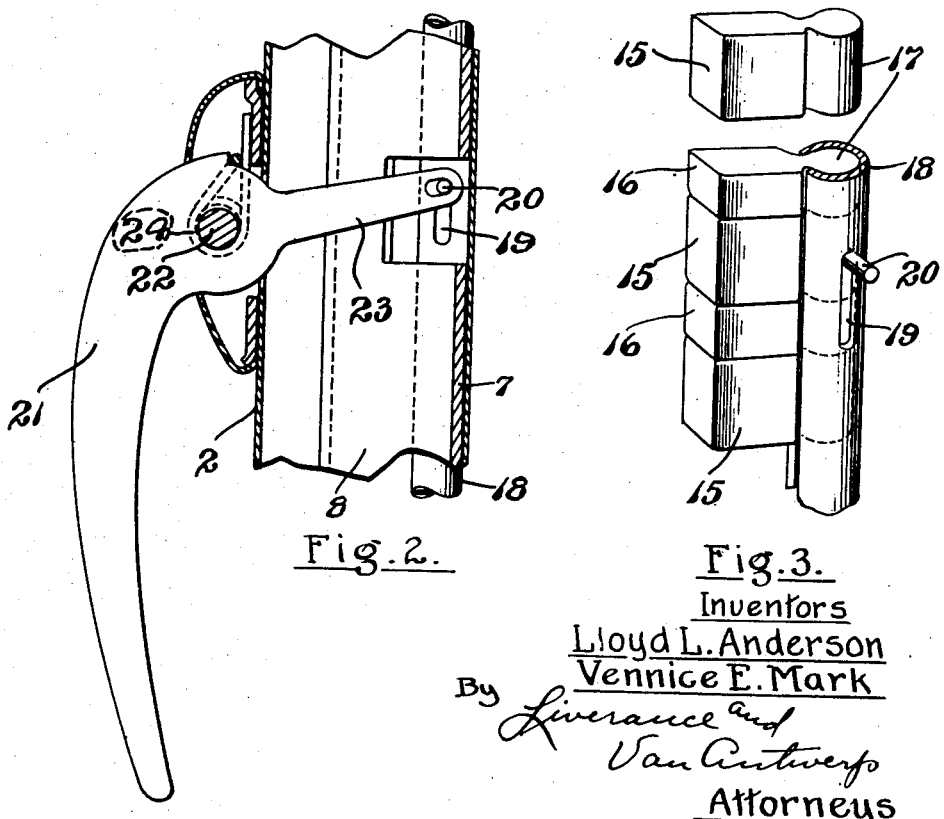
Fig. 2 is a fragmentary vertical section substantially on the plane of line 2—2 of Fig. 4 showing the latch releasing means.
Fig. 3 is a fragmentary perspective view directed to a detail of construction for moving and guiding certain parts of the structure from one position to the other in one of which the door closing and sealing means is operative and the other ineffective.

The fingers 12, blocks 14 and magnets 13 are spaced a distance from the inner side of the plate 10. In this space a consecutive series of alternate soft iron blocks 16 and intermediate blocks 15 of non-magnetic material are located, the length of the blocks 16 being equal to the face width of the magnets 13 and the same dimension of the blocks 15 being equal to the face width of the blocks 14. From each of the blocks 15 and 16 a projecting portion 17 of a generally cylindrical form extends laterally, being received in a casing 18 of metal which is slotted at one side as shown in Fig. 3, the projections 17 being freely movable lengthwise of the casing 18 so as to change the positions of blocks 15 and 16 and, therefore, their positions relative to the magnets 13 and blocks 14 at each side thereof.

The casing 18 has a longitudinal slot 19 closed at both ends (Fig. 3) and a pin 20 connected to the part 17 of one of the blocks 15 extends through said slot. An operating handle having a depending outer handle 21 at the outside of the door is pivotally mounted on a pivot pin 22 and is provided with an inwardly extending arm 23, the free end portion of which has a short slot through which the pin 20 extends. A relatively heavy torsion spring 24 acts on the lever to normally turn it in a counter-clockwise direction (Fig. 2) and move the several blocks 15 and 16 to a predetermined position, which position said blocks occupy at all times except when the handle 21 is grasped and pulled upwardly and outwardly, whereupon all of the blocks are shifted a short distance, being held and guided in the casing 18 in a manner similar to the housing in and holding of a flexible shaft.

In the normal position of the blocks 15 and 16 they are located relative to the magnets 13 and the blocks 14 at each side thereof as shown in Figs. 5 and 6, that is, with the soft iron block 16 covering the adjacent ends of the magnets 13 and with the blocks 15 of non-magnetic material covering adjacent ends of the blocks 14. When thus located with the door moved to closing position the short blocks 5 of soft iron within the gasket 3 are magnetically attracted and the side of the gasket between the plate 10 and the short blocks 5 is pressed against said plate 10, conforming to its surface and providing an effective seal. This is because of the paths of flow of the magnetic flux as diagrammatically indicated in Fig. 6.

When the door is to be released for opening the handle 21 is operated and the several blocks 15 and 16 are moved relative to the magnets and the side blocks 14 of non-magnetic material to the position shown in Fig. 7, wherein the soft iron blocks 16 extend across the adjacent faces of the blocks 14 and with the blocks 15 of non-magnetic material across the central portions of the adjacent faces of the magnets 13. In such case the flow of magnetic flux is altered as indicated in Fig. 7, and attraction upon the parts 5 released whereupon the door may be readily opened by an outward pull on the handle at 21.

With the construction described a secure and effective door retention in closed position and also an effective seal is provided which, in connection with refrigerators, safeguards against loss of refrigeration through undesired entrance of heat from the outside. As previously mentioned the flexible seal conforms itself to the surface of the plate 10 against which it engages by reason of the pull which is exerted by the permanent magnets being transmitted and applied directly to the sealing gasket.

The invention is defined in the appended claims and is to be considered comprehensive of all forms of structure coming within their scope.

We claim:

1. In a construction of the class described, a door jamb member, a door member movably mounted with respect thereto to be brought into closing relationship therewith, a sealing gasket of flexible compressible material secured to one of said members at the face thereof, an elongated channel support located within the other of said members, a magnet holder located lengthwise of the channel support and secured therein having spaced apart fingers extending toward the open side of the channel, a plate of non-magnetic material across the open side of the channel support, a permanent magnet and a block of non-magnetic material at each side of the permanent magnet located in each recess between adjacent fingers, a plurality of alternate blocks of soft iron and of non-magnetic material located between said magnet holder and said plate, and means for simultaneously shifting said blocks of soft iron and of non-magnetic material into positions where said iron blocks lie against the adjacent ends of the magnets and said blocks of non-magnetic material lie against the adjacent ends of the blocks of like material at each side of the magnets, or to another position where said blocks of soft iron extend across the blocks of non-magnetic material at each side of the magnets, and the adjacent end of each magnet is partially covered by a block of non-magnetic material between two adjacent soft iron blocks.

2. A construction as defined in claim 1, said means for shifting said iron blocks and the non-magnetic blocks between them comprising a manually operable lever mounted on the member which carries said magnets, and yielding spring means associated with said lever for returning it to its initial position after such shifting and upon release of the lever, in which initial position said soft iron blocks are against the ends of their respective magnets.

3. A construction containing the elements defined in claim 1, combined with a tubular guide located within said channel support lengthwise thereof and longitudinally slotted at one side, said soft iron blocks and the non-magnetic blocks alternating therewith having projecting portions of a generally cylindrical form disposed and guided in said tubular guide, said guide having a second slot with closed ends in one side, a pin extending from one of the blocks through said slot, a handle pivoted between its ends mounted upon the member upon which the magnets are mounted, the inner end of said handle having connection with said pin, and spring means acting on the handle to normally maintain it in a predetermined position.

VENNICE E. MARK.
LLOYD L. ANDERSON.

REFERENCES CITED

The following references are of record in the file of this patent:

UNITED STATES PATENTS

| Number | Name | Date |
|---|---|---|
| 451,603 | Sterry | May 5, 1891 |
| 2,252,144 | Taylor et al. | Aug. 12, 1941 |
| 2,288,688 | Dubilier | July 7, 1942 |
| 2,376,150 | Karasick | May 15, 1945 |
| 2,404,710 | Hitchcock | July 23, 1946 |
| 2,446,336 | Mark et al. | Aug. 3, 1948 |